Feb. 13, 1940. B. H. THURMAN 2,190,616
PROCESS OF SPLITTING GLYCERIDES AND RECOVERING GLYCERINE
Filed June 17, 1937 5 Sheets-Sheet 3
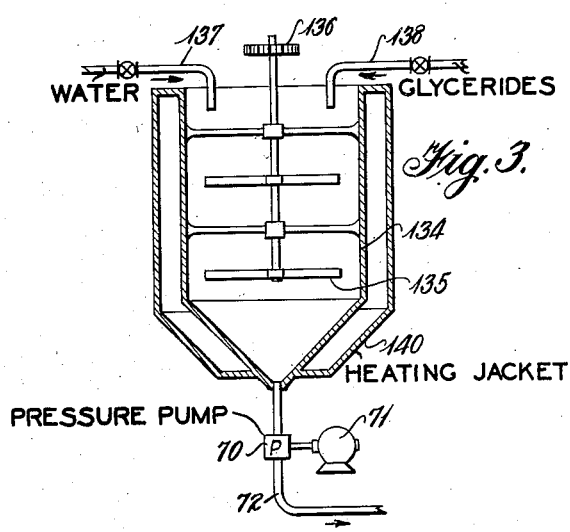
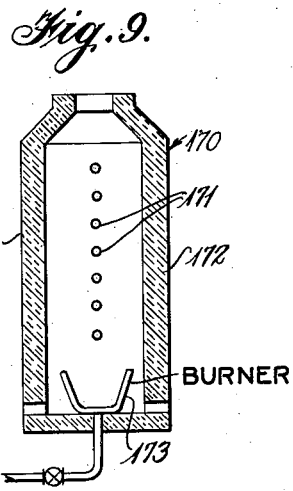
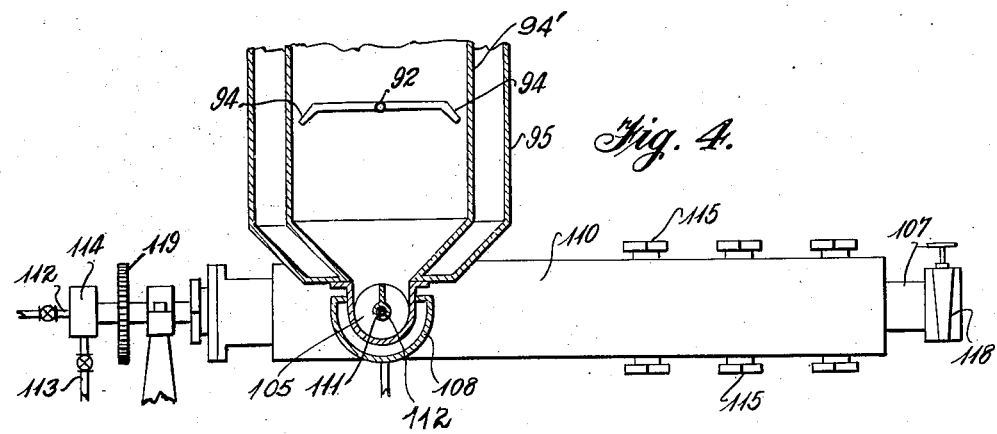
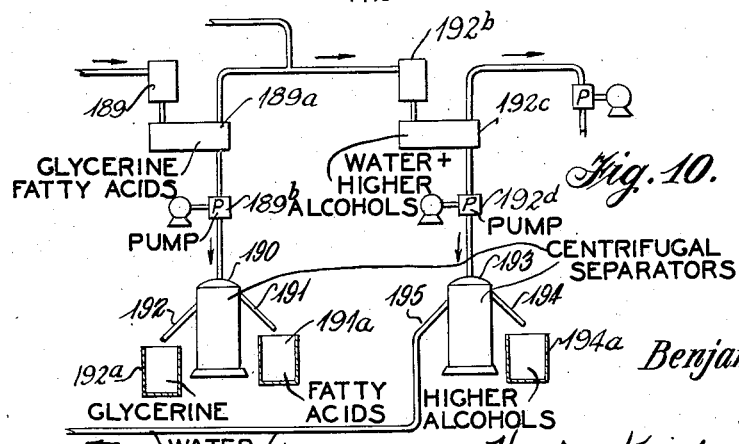

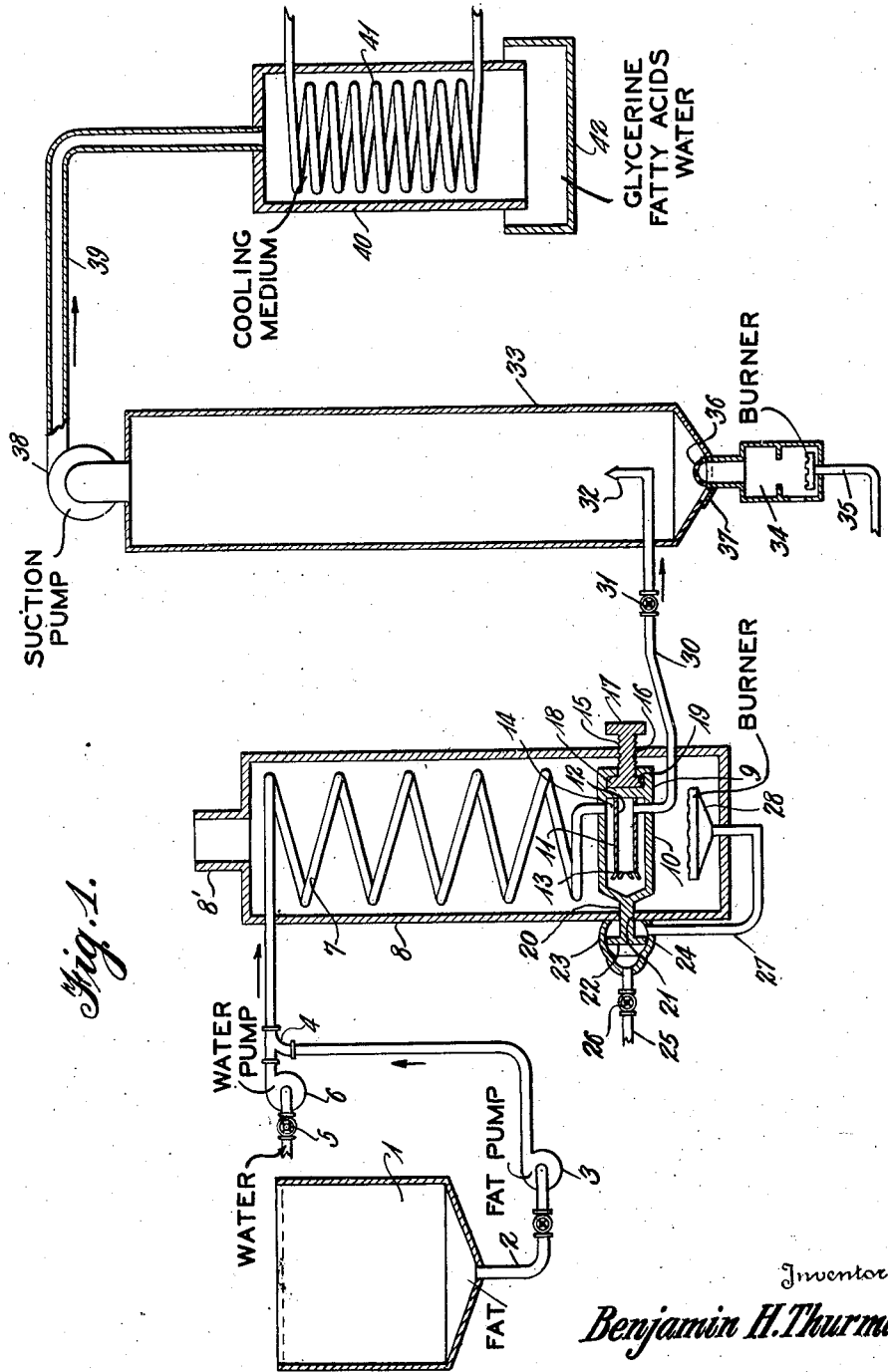

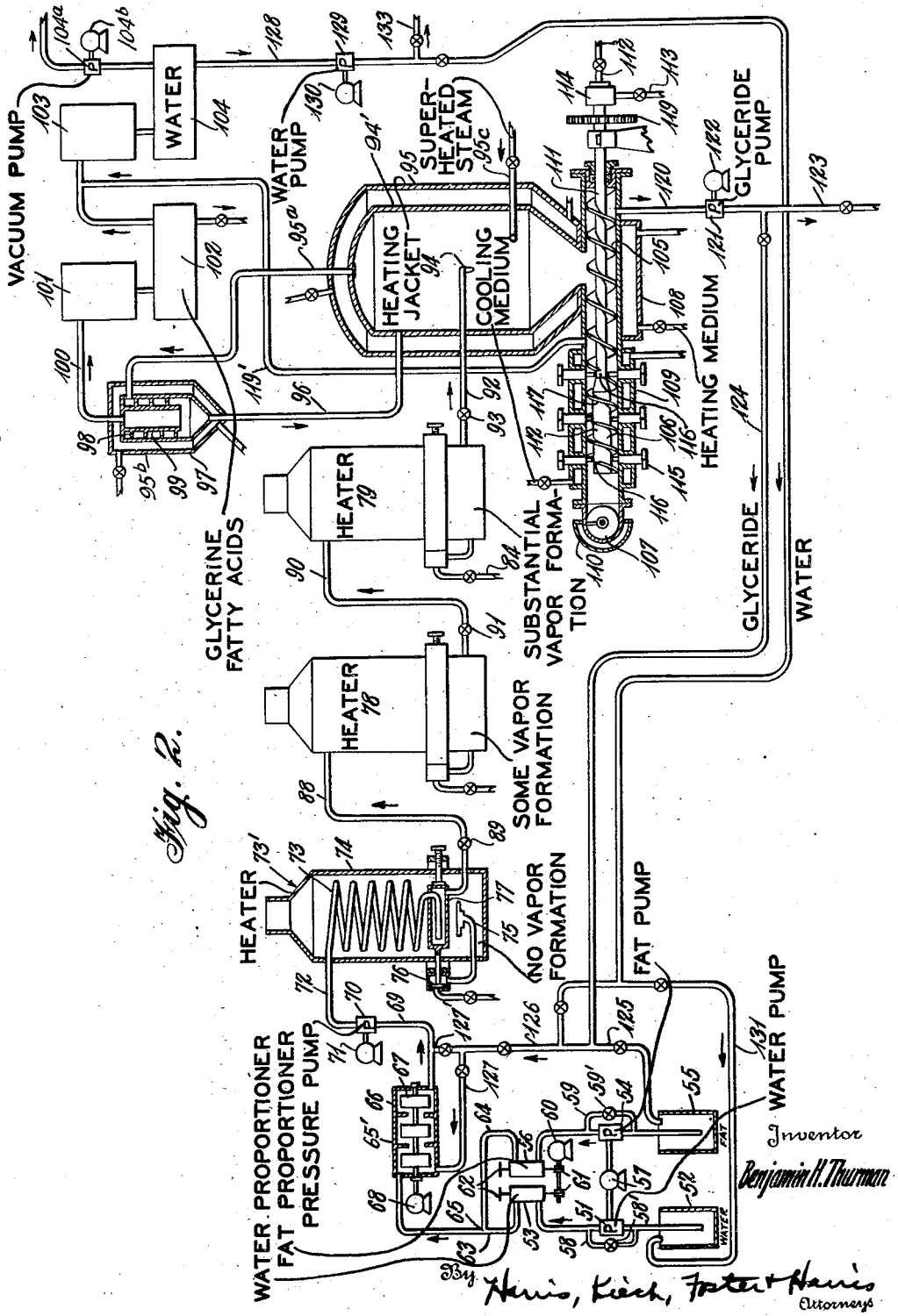

Feb. 13, 1940.  B. H. THURMAN  2,190,616
PROCESS OF SPLITTING GLYCERIDES AND RECOVERING GLYCERINE
Filed June 17, 1937  5 Sheets-Sheet 5

Inventor
Benjamin H. Thurman
By Harris, Kiech, Foster & Harris
Attorneys

Patented Feb. 13, 1940

2,190,616

UNITED STATES PATENT OFFICE 2,190,616

PROCESS OF SPLITTING GLYCERIDES AND RECOVERING GLYCERIN

Benjamin H. Thurman, Bronxville, N. Y., assignor to Refining, Inc., Reno, Nev., a corporation of Nevada Application June 17, 1937, Serial No. 148,788

14 Claims. (Cl. 260—415)

This invention relates to a process of splitting glycerides and recovering glycerin and more particularly to a process in which the glycerin and the fatty acids resulting from the splitting operation are continuously separated and recovered.

It is well-known that water reacts with glycerides to liberate glycerin and fatty acids. There are at least three well-known processes utilizing this reaction for separating fats, all of which have certain limitations, in that they either produce inferior fatty acids which are difficult to purify or the processes themselves are difficult to operate.

In the so-called autoclave method, a chamber which will withstand pressures of 120 to 150 pounds per square inch is employed. Water and a catalyst such as zinc oxide, magnesium oxide, slaked lime, caustic soda, calcium oxide, ammonia, sodium acid sulphate or concentrated sulphuric acid are employed as catalysts to cause the water to split the glycerides into glycerin and fatty acids. The autoclave is heated either with steam coils or with open steam passed through the reaction mass or by a combination thereof. This type of splitting is usually used on the lightest colored fats as there is less likelihood of discoloration of fats than with other methods which have been employed, but even this method requires acidulation of the digested mass and the high temperature and time required, even in the presence of steam, results in some discoloration of the fatty acids. Also, the process is extremely slow as 8 to 10 hours are required for each batch if efficient splitting is obtained. Furthermore, the high pressure employed with such autoclaves renders it impractical to build them in large sizes and a great number of autoclaves must be employed if fat splitting on a large scale is practiced.

The enzyme splitting (lypolytic) method has also been employed but is not generally used since it is very difficult to recover the glycerin from reaction products. This enzyme method makes lighter fatty acids than the autoclave method, but on the other hand, a troublesome emulsified material containing the glycerin, which is very difficult to handle in evaporation or distillation processes, results.

The Twitchell method, which includes treatment with sulphuric acid and benzene or naphthalene sulfonic acids as a catalyst can be carried on more rapidly than the autoclave method but produces darkened fatty acids which almost invariably have to be distilled before they can be converted into a satisfactory soap or otherwise employed.

The present invention provides a process, which produces glycerin and fatty acid from glycerides in a rapid and economical manner without discoloring the fatty acids. No catalysts are required as the water can be made to react directly with the glycerides although any of the catalysts above referred to can be employed in certain modifications of the process if for any reason it is found desirable to do so.

Also, glycerin exists as a by-product in residues from wineries and fermentation processes, such as brewers and molasses slops, and also in the so-called sweet waters from conventional soap making operations. The present process can also be employed for recovering this glycerin and any other valuable volatile constituents of the materials being treated. Certain of these materials also contain other valuable products which are in a plastic or solid form after the volatiles have been removed and the present process enables these plastic or solid products to be continuously recovered without deterioration.

Likewise, the glycerin and fatty acid separation and recovery steps of the present invention may be employed after the fat has been split by any of the methods of the prior art since even the troublesome emulsions of the enzyme method can be expeditiously separated by the present process, although the present process produces its best results when both the splitting and separation is carried on as a continuous and uninterrupted process.

It is, therefore, an object of the present invention to provide an improved method of splitting glycerides in which the glycerin and fatty acids are continuously recovered.

Another object is to provide a process of continuously separating glycerin from glycerin-containing materials and continuously removing plastic or solid materials from the separating zone.

Another object is to provide a process of continuously separating and recovering glycerin and fatty acids from the reaction products resulting from a glyceride splitting operation.

Another object of the invention is to provide a continuous process of splitting fats in a plurality of stages under different conditions of temperature and pressure whereby more difficult fats may be split under more drastic conditions without subjecting easily split fats to such conditions.

Another object is to provide for the separation and recovery of vaporizable unsaponifiable materials such as higher alcohols for example, sterols which are many times present in fats which are being split.

A further object of the invention resides in the provision of a process for continuously splitting glycerides without discolloration of the fatty acids.

A still further object of the invention is to provide a continuous process of splitting glycerides which does not require the employment of a catalyst which will discolor the fatty acids, and then continuously separating and recovering the glycerin and fatty acids.

Other objects and advantages of the invention will appear in the following description of the preferred embodiments thereof, which are described in connection with suitable apparatus for carrying out the process, shown in the attached drawings, of which:

Figure 1 is a schematic drawing of an apparatus suitable for carrying out one modification of the invention;

Figure 2 is a schematic drawing of a modified apparatus;

Figure 3 is a schematic drawing of a modified mixture device which may be employed in any of the modified processes described;

Figure 4 is a fragmentary schematic drawing of a portion of an evaporating chamber showing the disposition of the nozzles and conveyor;

Figure 9 is a schematic view of a modified heating device which may be employed in the present process; and Figure 10 is a schematic drawing of a portion of an apparatus showing the employment of centrifugal separators instead of the gravity separating devices of Figure 8.

Figure 5:
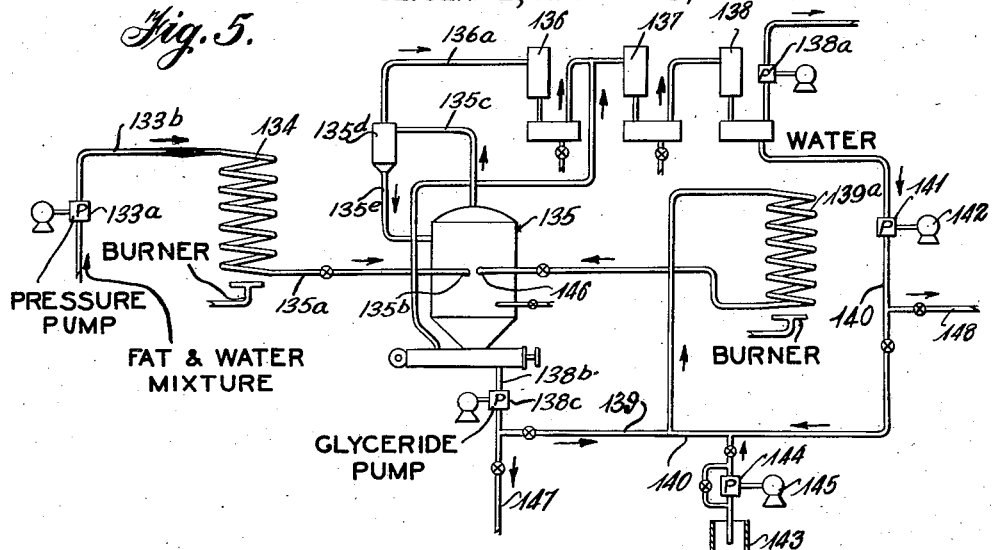
Figure 5 is a schematic drawing of a further modified apparatus for carrying out a process in which unsplit materials are further processed and returned to the vapor separating chamber.

By the present invention a convenient and economical method is provided for continuously passing through a heated zone definite portions of water and fat to be separated. This may be done by using pumps, one of which passes melted fat through a pipe and the other passes water. For example, 50% of water and 50% of fat by weight may be the correct ratio of the two under certain conditions. If so desired, a very small percentage of any well-known fat splitting catalyst may be used. However, fats can be split in accordance with this invention without the use of a catalyst which is required with the well-known autoclave or batch method.

In Figure 1 of the drawings, reference character 1 indicates a storage tank which may be heated, if desired, in any convenient manner. A valved pipe 2 leads from the lower portion of the tank 1 to a pump 3 from which a pipe leads to a mixer 4. A valved pipe 5 leads from a source of water or other liquid, that is to be mixed with the liquid from the pump 3, to the pump 6 from which a pipe leads to the mixer 4.

The mixer 4 is connected to the coil or passageway 7 that is installed in the furnace or combustion chamber 8. The lower end of the coil 7 opens into an automatic heat regulator or thermostat 9.

The heat regulator 9 comprises an elongated hollow member 10 extending across the lower end of the chamber 8, with an inner tube 11 anchored at its closed end 12 in the hollow member 10. The other end 13 of the tube 11 is open and the walls are slitted and spread out leaving openings for material to pass from the annular space 14 between the tube 11 and member 10 into the tube 11.

One end of the heat regulator 9 is held in adjusted position by the threaded support 15 passing through a threaded opening 16 in a wall of the chamber 8. An enlarged head or hand wheel 17 is provided on the outer end of the support 15 for turning it. The inner end of the support 15 terminates in an enlargement 18 revoluble in a recess 19 provided therefor at the closed end of the member 10, so that the heat regulator 9 can be moved longitudinally into different position by means of the support 15.

The end of the member 10 opposite the support 15 carries a stem or extension 20 which extends through an opening 21 in the wall of the heater 8 and supports that end of the heat regulator 9. A valve 22 is fixed on the outer end of the stem 20 in a housing 23 that is attached to the wall of the chamber 8 and carries a valve seat 24. The extent of opening of the valve 22 can be changed by moving the heater 9 longitudinally by turning the hand wheel 17. A pipe 25, having a valve 26, for fluid fuel, such as gas, is connected to the housing 23 on the side of the valve seat 24 opposite the valve 22. An outlet pipe 27 leads from the other side of the valve seat 24 to the burner 28. The heat regulator 9 thus controls the amount of fuel supplied to the burner 28 so as to maintain the temperature of the mixture leaving the coil 7 substantially constant. The temperature of member 10 is controlled by the heat of the products of combustion from the burner 28 and the temperature of the mixture leaving the coil 7. When the temperature of member 10 increases it expands and partially closes valve 22 thus cutting down the supply of fuel. Conversely the supply of fuel is increased if the temperature of member 10 decreases. The normal position of valve 22 is determined by the handwheel 17 so that any desired temperature of the mixture leaving the coil 7 can be automatically maintained.

An outlet pipe 30 having a valve 31 leads from the heat regulator 9 to a nozzle 32 that is located in an expansion chamber 33. Another important function of the type of thermostat or heat regulator illustrated is that the tortuous passage therethrough provides a further mixing action immediately before the materials leaving the coil 7 are introduced into the expansion chamber 33.

The expansion chamber 33 may be heated by a gas heater 34 that is provided with a burner 35. A perforated outlet 36 through which hot air and products of combustion pass, extends from the gas heater 34 into the chamber 33 so that hot air and products of combustion are continuously delivered into this chamber to maintain the chamber at the desired temperature. This is merely an example of the way this chamber can be heated. An outlet 37 for solid products that settle from the spray which issues from the nozzle 32 is provided at the lower portion of the chamber 33.

A suction fan or pump 38 is provided for withdrawing the vapors and gases from the chamber 33 and maintaining the desired amount of vacuum in this chamber. A pipe 39 leads from the suction pump 38 to the condenser 40 which is provided with a cooling coil 41 through which a cooling fluid is passed to condense the condensible material that enters the condenser 40. A receptacle 42 for the condensate is provided below the condenser 40. In cases where fractional condensations are desired, the receptacle 42 may be closed and provided with separate outlets for the condensate and the uncondensed material so that the uncondensed material can be led to one or more succeeding condensers that are kept cooler.

In carrying out the process the fats that are to be split are passed from the tank 1 through the pump 3 into the mixer 4 where water entering through the pipe 5 and pump 6 is mixed with the fat in the desired proportions. The mixture passes into the coil or passageway 7 where it undergoes turbulence or rapid change in direction of flow so that intimate mixture of the constituents is brought about and rapid heat transfer from the furnace gases in the chamber 8 to the mixture takes place.

The length of the coil or elongated passageway 7 is dependent upon the temperature and the pressure to which the mixture of fat and water is to be heated and also the rate at which they are passed through, as well as the cross-section of this elongated passageway. For purposes of description and based on practical operations performed heretofore, it is convenient to use a three-quarter inch outside diameter steel tube. If it is desired to use sulphuric acid or any acid catalyst like "Twitchell's solution," this coil, or elongated passageway, should be made of acid-resisting metal such as nickel-copper-chromium alloys. The pressure in the coil 7 is maintained at the desired point to prevent or limit volatilization of constituents by regulating the valve 31 or by use of a properly restricted nozzle 32 in the chamber 33.

In this way high temperatures and high pressures are conveniently reached without damaging the fat, as the passage of the fat and water through the elongated passageway causes intimate mixing of the water and the fat. Maintenance of pressure in the coil 7 by the valve 31 and restricted nozzle outlet 32 limits the amount of evaporation or vapor formation while the mixture is passing through this coil or passageway. The arrangement of the passageway as a coil brings about quick-changing of the direction of flow of the particles of the mixture, thus preventing what is ordinarily known in liquids flowing through pipes as the "skin effect," or local overheating.

Temperatures as low as 300° F. may be used with pressures from 150 pounds or higher, but it is generally preferable for easily split glycerides to keep the temperatures between 350° F. and 450° F. and to maintain the pressure as high as 200 pounds where no catalyst is used. Somewhat higher temperatures and pressures are needed without catalysts than with them. In either case, pressures as high as 1500 or 2000 pounds per square inch or higher can be employed with fats which are difficult to split along with temperatures corresponding approximately to the boiling point of water at the pressure employed. A sufficient amount of vaporization may be caused to take place in the coil or passage 7 and enough heat may be stored in the vapors and the remaining liquids to cause substantially complete volatilization of the liquid portion when the mixture escapes from the nozzle 32 and the pressure is released.

Instead of using water and one of the catalysts mentioned above, I may add to the glycerides to be split about 20% or 30% of glycerin sweet waters obtained from the soap kettle after making soap by treating fatty glycerides with alkalis. The sweet waters may be introduced into the tank 1 or may be introduced through the pipe 5. This provides enough soap, salt and water to act as a catalyst for splitting the glycerides; at the same time, the glycerin in the sweet waters can be recovered automatically from the condenser 40 along with the glycerin which is split from the glycerides during the reaction.

The mixture of fat and water and/or glycerin sweet waters is allowed to escape through a valve or nozzle located at the end of the heated coil or passageway so that the pressure is suddenly reduced and volatile products flash into vapors as the products leave the coil or passageway. The mixture leaves the nozzle 32 and enters the container or chamber 33 at reduced pressure. This chamber is preferably maintained at about the temperature of the mixture after expanding into this chamber. This chamber may be under vacuum or may be closed to the atmosphere. The solid or unvaporized products settle and are withdrawn through the outlet 37. The fan or suction device 38 removes the vapors of fatty acids and glycerin and water which are formed on expanding into the chamber 33. The glycerin, together with some of the water, is condensed and collected in the receptacle 42 while the uncondensed products pass out of the top of the receptacle.

Or, the volatile products which are water, glycerin and fatty acids may be led from the pipe 39 to a series of fractional condensers maintained at the proper temperatures so as to condense the fatty acids in the first one, which is kept at a temperature of slightly less than 300° F. for this purpose. The other condensers should be kept at successively lower temperatures in order to condense the glycerin and the water vapor separately. Alternatively, only two condensers can be employed. In this case the first condenser is operated just above the boiling point of water at the pressure in the condensing system. The glycerin and fatty acids both condense in the first condenser and can easily be separated by gravity since they are immiscible and the fatty acids are lighter than the glycerin. The second condenser is operated to condense the water. Some of the fatty acids, and in some cases a small amount of glycerin, will be carried over into the water condenser and this material can be recovered by mixing the condensed water with the fats to be split.

Instead of permitting the reaction mixture of water and glycerides to expand suddenly, as described above, by permitting it to escape from the heated high pressure coil 7 into a low pressure chamber, the mixed glycerin, fatty acids and water may be permitted to discharge into the suction of a compressor similar to an air or gas compressor after it has been heated in the first chamber of the elongated passageway to a temperature of 350° F. to 400° F. This mixture is then compressed to any higher pressure desired and at the same time a higher temperature is thereby automatically created without the use of flame or any external source of heat, thus avoiding the danger of localized overheating at the higher temperature. The compressed fatty acids, glycerin and water vapors are then expanded into a closed chamber with or without vacuum, and the vapors are then led to fractional condensers for condensing. The compressor is heat insulated so that practically all of the work of the compressor is converted into heat which goes into the substances compressed, thereby bringing about temperatures as high as 500° to 600° F., and pressures up to 300 or 400 or even to 1500 to 2500 pounds per square inch without any damage or deterioration to the substances compressed. This brings about a complete splitting of the glycerides into the glycerin and fatty acids and at the same time a complete volatilization of the glycerin and the fatty acids and the water vapors take place when the mixture suddenly expands. In this way a continuous method of splitting glycerides and recovering the component parts is provided.

Referring to Figure 2, in apparatus for carrying out a modified process includes a water pump 51 for withdrawing the water from a source of supply which may be a tank 52 and delivering the same to a water proportioning cylinder 53. The apparatus also includes a glyceride or fat pump 54 for withdrawing glycerides from a source of supply which may be a tank 55 and delivering the same to a glyceride proportioning cylinder 56. The pumps 51 and 54 may be driven by a motor 57 and are by-passed by conduits 58 and 59, having pressure release valves indicated at 58' and 59', respectively, so that water and glycerides may be delivered to the proportioning cylinders 53 and 56, respectively, at predetermined pressures controlled by the pressure release valves in the by-passes 58 and 59.

The proportioning cylinders are well-known devices for delivering predetermined amounts of materials and have free double acting pistons and D-valves (not shown), the valves being actuated by a motor 60 through eccentrics indicated at 61. A liquid material entering the cylinder on one side of the piston forces the measured materials from the other end of the cylinder and the admission and discharge of liquid to and from the cylinders is controlled by the D-valves above mentioned. The stroke of the pistons may be adjusted by hand wheels indicated at 62 and by adjusting these hand wheels any desired amounts and proportions of water and glyceride may be delivered through the pipes 63 and 64, respectively, to the junction of these pipes at 65. The combined stream may be delivered to the mixing device 65' which may be of any conventional type of emulsifier or mixing apparatus for producing a thorough mixture. As shown, by way of example, this device may comprise a closed chamber 66 containing an agitator 67 driven by a motor 68. The material is discharged from the mixing device 65' through the pipe 69 to the inlet of a high pressure pump 70 driven by a motor 71 and is discharged from the pump through a pipe 72 to the inlet of a heating coil 73 in a heating device 73'.

The heating coil 73 is surrounded by a casing 74 in which is positioned a burner 75. The fuel supply to the burner is controlled by a valve 76 actuated by a heat regulator or thermostat 77, which may be similar to that shown at 9 in Figure 1, through which the materials from the heating coil 73 are passed. The mixture of water and glycerides is brought to a splitting temperature within the heating coil 73 and subjected to a high pressure therein imposed by the pump 70 and maintained by the small diameter of the pipe forming the coil or a valve as hereinafter described. The material being heated flows through the coil with sufficient velocity to maintain the mixture and prevent local overheating in the coil. If necessary, in splitting a difficult fat two or more coils may be employed in series, and, by way of example, two additional heating devices 78 and 79, which may be entirely similar to the heating device 73, are shown.

It will be noted that the materials leaving the coil, flow through a tortuous path in the thermostat 77 and one of the advantages of the type of thermostat described is the additional mixing or homogenizing effect produced thereby immediately before the material is discharged into a second heating device or finally discharged into a vapor separating chamber. Any other type of mixing devices, such as a mechanical agitator, can be employed, although with many fats, no trouble is experienced in maintaining an adequate homogeneous condition of the materials, such that no mixing devices are necessary.

A pipe 88 provided with a valve 89 leads from the first heating device to the heating device 78 and a pipe 90 provided with a valve 91 leads from the heating device 78 to the heating device 79. Likewise, a pipe 92 provided with a valve 93 delivers the heated materials to nozzles 94 positioned in a vapor separating chamber 94'. By adjusting the valves 89, 91 and 93 any desired pressures may be maintained in the coil of the heating device 73' and the pressures may be made progressively lower in the heating devices 78 and 79.

A high vacuum is ordinarily maintained in the vapor separating chamber 94' by a vacuum pump in conjunction with a series of condensers as hereinafter described. The vapor separating chamber is provided with a heating jacket 95 through which any desired heating medium such as steam or heated mineral oil may be passed to maintain the walls of the chamber in a heated condition. As illustrated more clearly in Figure 4, it has been found advantageous to discharge the mixture from the nozzles 94 against the heated walls of the chamber so that the mixture is spread in thin films on the heated walls to assist in removing volatiles. It will further be noted that this provides for a substantially unobstructed passage of vapors upwardly through the center of the vapor separating chamber 94' to the vapor discharge pipe 95a (Figure 2) so that the withdrawn vapors do not have to pass through a spray of materials entering the chamber and entrainment of solid and liquid materials in the withdrawn vapors is largely prevented.

After the splitting operation has been completed in the heating devices 73', 78 and 79, substantially all of the fatty acids, glycerin and water can be separated as vapors in the chamber 94' and withdrawn through the pipe 95a into an entrainment separator 95b. Additional heat may also be supplied to the vapor separating chamber 94' by introducing steam, preferably superheated, through pipe 95c to assist in vaporization and prevent cooling due to expansion. Any liquid or solid material entrained with the vapors is separated therefrom in the entrainment separator 95b and returned to the vapor separating chamber 94' through the pipe 96. The entrainment separator 95b is provided with a heating jacket 97 to prevent condensation of vapors therein. The entrainment separator 95b may be of any conventional type and preferably include a spiral passage formed by vanes 98 surrounding an inner baffle 99 for throwing any liquid or solid particles out of the vapors.

The separated vapors are withdrawn from the entrainment separator 95b through a pipe 100 and delivered to a condenser 101 in which the glycerin and fatty acids may be condensed and delivered to a receiver 102. As many supplemental condensers 103 may be provided as are desirable to fractionally condense the glycerin, water and various fatty acids produced from the fat being treated. Ordinarily it is desirable to employ but two condensers as the glycerin and fatty acids may both be condensed in the condenser 101 and later separated by difference in specific gravity, as by gravity or centrifugal separating operation, since the glycerin and fatty acids are immiscible in each other and the fatty acids are of less specific gravity than the glycerin. This operation may be made a part of the continuous process as will be more fully described with reference to Figures 8 and 10.

Where only two condensers are employed, the water is condensed in condenser 103 and delivered to receiver 104. A vacuum is maintained in the vapor separating chamber 94', entrainment separator 95b, condensers 101 and 103 and receivers 102 and 104 by a vacuum pump 104a driven by a motor 104b. Small proportions of fatty acids, or in some instances, a small amount of glycerin is carried over into the condenser 103 and receiver 104, in which case, these materials may be recovered by returning the water, as hereinafter described, to the mixture entering the process. Also, as hereinafter described with reference to Figures 8 and 10, certain vaporizable impurities, such as higher alcohols, for example, sterols, may be separated from the water and recovered as a valuable by-product before the water is returned to the process.

The fats being split, ordinarily contain nonvolatile constituents other than glycerides, which collect in the bottom of the vapor separating chamber 94'. These materials may be relatively thick and viscous similar to tar or may be solid particles which would eventually fill the vapor separating chamber, and interfere with the separation of the volatiles therein. Such viscous or solid materials cannot be pumped but can be continuously pushed from the vapor separating chamber by means of a screw conveyor or screw pump 105 (Figures 2 and 4). Such a screw conveyor has been found to be an efficient device for removing solid or plastic material from a vacuum chamber without breaking the vacuum. One satisfactory form of conveyor has its shaft provided with an enlarged end 106 adjacent the discharge end of the screw 105 so as to restrict the discharge opening. This expedient has been found to cause the materials being removed to effectively plug the end of the conveyor so as to prevent air from entering the vapor separating chamber. It is many times desirable to cool or otherwise control the temperature of the materials discharging from the conveyor before they are brought into contact with the air and, if a single conveyor is not sufficient, a supplemental screw conveyor 107 may be provided. Both conveyors may be provided with cooling or heating jackets 108, 109 and 110 so as to vary the temperatures of the materials being discharged and it has also been found desirable in many cases, to provide the conveyors with hollow shafts 111 through which a cooling or heating medium may be circulated. This may be accomplished by providing a pipe 112 extending into the hollow shafts 111 and a discharge pipe 113. These pipes may be connected to the hollow shaft by a suitable packing gland 114.

In any case, particularly with viscous sticky materials, the material being discharged tends to rotate with the conveyor without being advanced thereby. This can be prevented by employing stationary members 115 extending through the conveyor casings and into slots 116 in the conveyor flights. It has also been found advantageous to reduce the pitch of the conveyor flight adjacent the discharge end as shown at 117 in Figure 2. Ordinarily, the jacket 108 immediately under the vapor separating chamber 94' is supplied with a heating medium in order to help maintain a high temperature in the vapor separating chamber while the jackets 109 and 110 are supplied with a cooling medium in order to cool the discharging material to render it more viscous and prevent injury thereto when the material is delivered to the atmosphere. The cooling of the material in conjunction with the enlarged end 106 of the conveyor shaft, the stationary members 115 and the reduced pitch of the flights adjacent the discharge end of the conveyor, all contribute to sealing the vacuum of the vapor separating chamber 94' from the atmosphere, although all of these expedients may not be necessary in a particular case. In many instances a single conveyor is sufficient although two are shown and if necessary more than two can be employed. In any case the discharge conveyor is provided with a valve 118 (Figure 4) so that the vacuum may be maintained until the conveyors have become filled with material so as to seal the vacuum. During continuous operation, the valve 118 is maintained in open position. The conveyors are driven from any suitable source of power through driving elements, for example, sprockets 119. The hollow shaft 111 along with the pipes 112 and 113 providing for the passage of a heating or cooling medium through the hollow shaft has been found to be an extremely sensitive means for rapidly varying the temperature of the discharging material and ordinarily finds use as a sensitive control for rapidly correcting the temperature of the material discharging from the conveyor. Any additional vapors liberated in the conveyor may be withdrawn therefrom through a vent pipe 119' (Fig. 2) which is preferably connected to the vacuum system after the first condenser in order to avoid any possible return of liquid materials to the conveyor.

In the process carried out in the apparatus of Figure 2 it is preferable to provide enough heating devices 73', 78 and 79 to complete the splitting operation in a single passage of the material therethrough. This provides for substantially complete vaporization of all of the liquid materials in the process and results in the deposition of solid or plastic products in the vapor separating chamber. All such products can be removed from the system and no recirculation, resulting in the building up of impurities in the system is required. If substantially complete splitting in a single passage through the heating devices is not practical with a particular fat being processed, liquid materials can be withdrawn from the bottom of the evaporating chamber through a pipe 120 by means of pump 121, driven by a motor 122. If desired, these materials may be discharged from the process through a pipe 123, but in many cases it has been found possible to return at least a part of these materials through a pipe 124 to the beginning of the process and recycle them through the splitting operation. The return materials may either be delivered into the glyceride or fat tank 55 through a pipe 125, to the mixing device 65' through pipes 126 and 127, or directly to the intake of the pump 70 through pipes 126 and 127'. The cumulative building up of impurities in the system can be prevented by bleeding a part of the liquid materials from the system by partly opening the valve in pipe 123 and partly closing the valve in pipe 124.

Also, the water from condenser 104 may be returned through a pipe 128 by means of a pump 129, driven by a motor 130, to the water supply tank 52 by a pipe 131. Alternatively, this water may be delivered into the pipe 126 so as to be delivered into the mixing device 44 through pipe 127 or into the intake of the pump 70 through the pipe 127'. If glycerides from the bottom of the vapor separating chamber 94' are being returned to the mixer 65' or the pump 70, the water may be mixed therewith in the pipe 126. This water or a part thereof may also be discharged from the system through a pipe 133 in case it contains impurities which it is not desirable to return to the system as such impurities would eventually build up in the system due to recirculation of the water.

In many cases it has been found unnecessary to use the mixing device 65' as sufficient mixing between the water and glycerides entering the system is provided by merely injecting the glycerides into a flowing stream of water, as at 63, or, alternatively, injecting the water into the flowing stream of glycerides. This is particularly true since the pump 70 functions as an additional mixing device. Also the device of Figure 3 may, if desired, be substituted for the proportioning and mixing apparatus illustrated in Figure 2. The device of Figure 3 may include a receptacle 134 provided with an agitator 135 rotated through the sprocket 136 from any suitable source of power. A measured quantity of water with or without a splitting catalyst may be introduced into the receptacle 134 through a pipe 137 and a measured quantity of glycerides may be delivered into the receptacle through the pipe 138. A heating jacket 140 may be provided for increasing the temperature of the materials in the receptacle 134 so that an adequate mixture can be made and the mixture can be pumped. It is, however, desirable to increase the temperature as far as practical in the mixing device 134 so as to decrease the amount of heat which must be supplied in the heating devices 73', 78 and 79. Alternatively, the water and glycerides may be preheated before being introduced into the mixing receptacle 134. By using the mixing receptacle 134, a mixed batch of water and glycerides may be delivered by the pump 70 and pipe 72 into the entrance of the heating coil 73 of Fig. 2. Two or more mixing receptacles 134 may be provided in order that a continuous supply of mixture is available.

In carrying out the process in accordance with Figure 2, the water is preferably preheated in the tank 52 up to a temperature approaching the boiling point of water and the glyceride in the tank 55 is preferably preheated to a temperature approaching that at which the glyceride will start to decompose in contact with the atmosphere. This temperature will vary with different glycerides and no definite temperature can be given although temperatures in the neighborhood of 200 to 220° F. have been successfully employed. This preheating of the water and glycerides provides an improved process, but may sometimes be omitted. Proportionate amounts of water and glycerides are brought together at 65 at the junction of the pipes 63 and 64 and delivered to the mixing device 65' in which they are thoroughly emulsified. Any suitable splitting catalyst may be employed such as zinc oxide, magnesium oxide, caustic soda, ammonia, sodium acid sulphate, concentrated sulphuric acid, or the well-known Twitchell reagent in proportions known to the art, although in the present process no splitting catalyst is in many cases necesary. In case a catalyst is used, it has been found that the glycerin sweet waters from soap making operations are particularly effective.

Oil and water emulsifying agents, typical of which are, soap, karaya gum and sulfonated oil, may be employed to stabilize the emulsion to preserve the mixture during heating. Certain of such agents, for example, those above mentioned, are also splitting catalysts. Also fuller's earth or acid treated clay can be employed as splitting and emulsifying agents.

The pump 70 imposes a high pressure on the material passing through the heating coil 73 and this pressure may be maintained by the valves 89, 91 and 93. Pressures as high as 1500 to 2000 pounds per square inch can be employed in the first heating coil and the temperature increased up to approximately 600° F. to 640° F. In the first heating device, it is preferred to prevent substantial vaporization by maintaining a high pressure so that substantially all of the materials therein are maintained in liquid phase. The pressure is preferably lowered by suitably opening valves 91 and 93 in the heating devices 78 and 79 so that vapors are formed in these heating devices. For example, part of the volatile materials such as glycerin, fatty acids and water may be in vapor form in heating device 78 and very largely in vapor form in heating device 79. If desired, the pipe coils in the latter heating devices may be of larger diameter pipes than in the first coil to provide for expansion and longer time of treatment. Instead of using valves 89, 91 and 93 the diameter of the pipe employed in the various heating coils may be such that the velocity through the various coils provides for high pressure in the first coil and progressively lowering pressure throughout the second and third coil. While three coils have been shown, as many as necessary may be used to provide for sufficient time of treatment. That is, with a difficultly split glyceride more heating devices may be necessary, while with an easily split glyceride, one or at most two may be sufficient.

The heat supplied in the latter heating devices 78 and 79 is to a large extent utilized in vaporizing materials therein, and a mixture of vapors and liquids is discharged into the vapor separating chamber 94'. As before indicated this mixture is preferably discharged against the heated walls of the vapor separating chamber so that the liquid in the mixture spreads in thin films upon these heated walls. Vapors are thus more easily liberated from the liquid discharged against the walls and additional heat is supplied thereto to liberate additional vapors. Also additional heat can be supplied to the vapor separating chamber by introducing steam, preferably superheated, through the pipe 95c. The vapors are removed through the pipe 95a, any entrained liquids or solids are separated therefrom in the entrainment separating device 95b, and the vapors condensed in the condensers 101 and 103. Solids or plastic materials are removed from the vapor separating chamber and cooled by the conveyor 105. If the glyceride being split has substantially no solid or plastic impurities therein this conveyor may be dispensed with. In the process of Figure 2 it is preferred to substantially completely split the glycerides in one passage through the process so that there are no substantial amounts of liquids to be removed from the vapor separating chamber. However, if it is impractical to split all of the glycerides in one passage through the process, all or a portion of the liquid materials deposited in the vapor separating chamber 94' may be returned through the pipe 124 to the inlet of the heating step. In order to prevent solid or liquid impurities building up in the system a portion of the liquid from the evaporating zone may be continuously discharged from the process through pipe 123.

As above indicated, fatty acids and glycerin may both be condensed in condenser 101 and later separated by gravity or centrifugal separation steps, and as further explained with reference to Figures 8 and 10, this may be a continuous operation.

Figure 6:
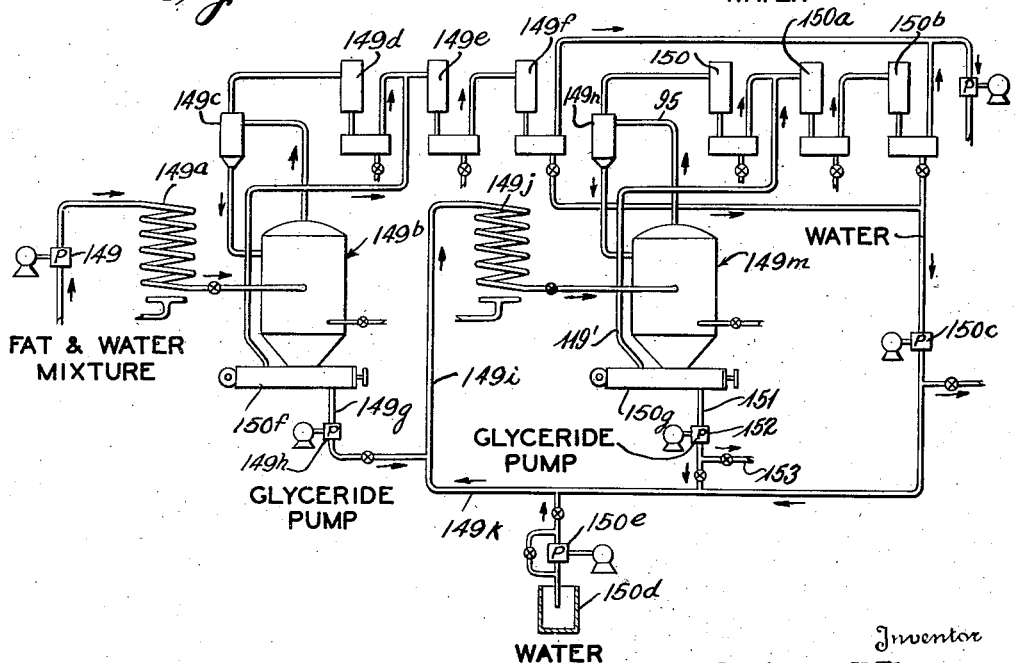
Figure 6 is a similar drawing of a further modified apparatus for carrying out a process in which condensed materials from a second splitting operation are kept separate from those from a first splitting operation.
Figure 7:
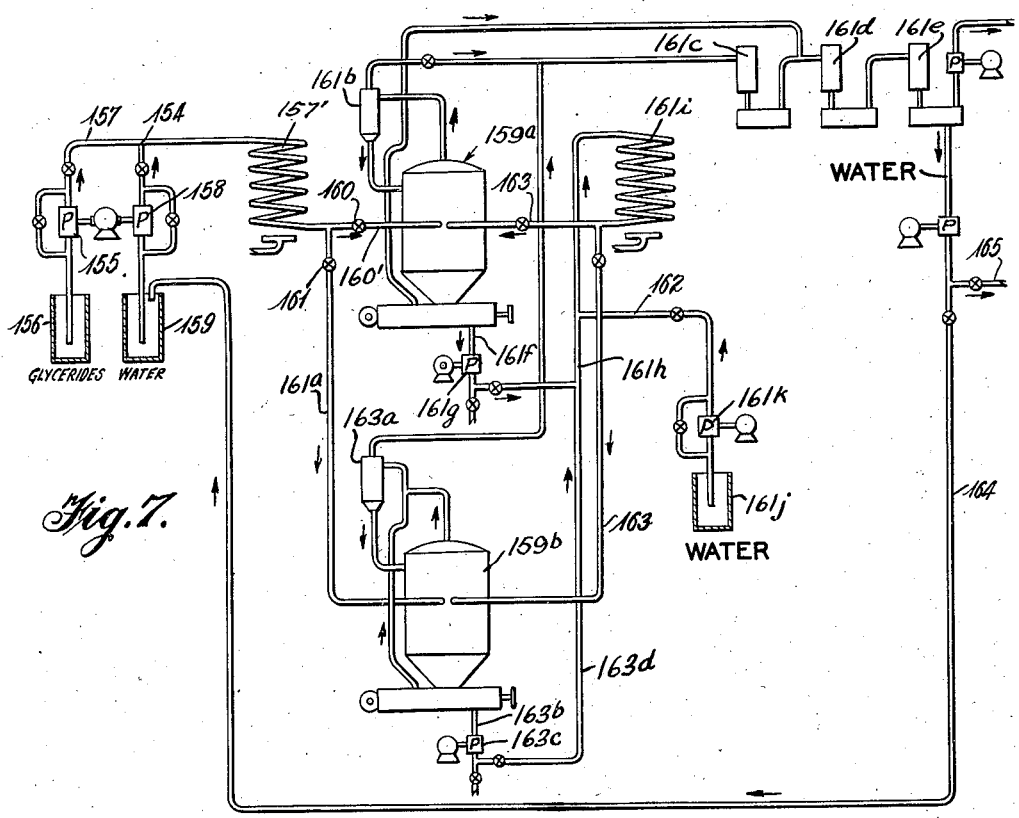
Figure 7 is a similar view of an apparatus for carrying out a further modified process.

The apparatus and process of Figure 5 differs from that of Figure 2, in that unsplit glycerides withdrawn from a vapor separating chamber are treated in a separate heating device and are returned to the vapor separating chamber after being further split. In this process, a mixture of water and glycerides from either a batch mixing device, such as that shown in Figure 3, or a continuous mixing device, such as that shown in Figure 2, is forced by a pump 133a through a pipe 133b and then through a heating coil 134, which may be entirely similar to the heating coil 73 of Figure 2, to a vapor separating chamber 135. As in the case of Figure 2, several heating coils may be employed in series. The diagrammatic heating coils illustrated in Figures 5 to 8, inclusive, are intended to indicate one or more heating devices depending upon the amount of splitting desired and the time necessary to effect said splitting. Similarly the vapor separating chamber 135 of Figure 5 and the similar vapor separating chambers of Figures 6, 7 and 8 are intended to diagrammatically illustrate vapor separating chambers similar to the vapor separating chamber 94' of Figure 2 except that certain of the chambers may have two sets of nozzles for entering materials.

After the mixture of glyceride and water has been treated in coil 134 (Fig. 5) to partially split the glyceride, the mixture is delivered by the pipe 135a to nozzles 135b in the vapor separating chamber 135, wherein glycerin, fatty acids and water vapors are separated and delivered by the pipe 135c to the entrainment separator 135d.

Liquid and solids separated from the vapors are returned to the vapor separating chamber through the pipe 135e and separated vapors are delivered to the condenser 136, by a pipe 136a. Three condensers 136, 137 and 138, with appropriate receivers are illustrated in Figure 5 for obtaining different fractions of glycerin, fatty acids and water, and a vacuum pump 138a is provided for maintaining a vacuum in the condensers and the vapor separating chamber. Unsplit glycerides are removed from the vapor separating chamber through a pipe 138b by a pump 138c, and are forced through a pipe 139 and through a heating coil 139a. Additional water is added to these unsplit glycerides by introducing the same from a pipe 140 into the pipe 139. This water may be either water condensed in the last condenser 138 and withdrawn from the receiver associated therewith by a pump 141, driven by a motor 142, and thereby forced through the pipe 140 or it may be fresh water withdrawn from a tank 143 and forced by a pump 144, driven by a motor 145, into the pipe 140. The resulting mixture of water and unsplit glycerides is thus forced through the heating coil 139a, which as before indicated, may be one or several coils in series, and the heated materials delivered to the nozzles 146 positioned in vapor separating chamber 135. Any glycerides which are not split by the second treatment in the coil 139a will again be forced through the coil 139a for another splitting operation. To prevent non-volatile liquid impurities from building up in the system any desired proportion of unsplit liquids may be continuously withdrawn through the pipe 147 by properly adjusting valves in the pipe 147 and the pipe 139. Similarly, to prevent volatile impurities from building up in the system any desired proportion of the water condensed in condenser 138 may be discharged from the system through the pipe 148 by properly adjusting the valves in pipes 148 and 140.

Preferably, the glycerides are subjected to more drastic treatment in coil 139a than they were originally subjected to in coil 134. Thus the more easily split glycerides are split in the coil 134 without being subjected to extreme temperatures and pressures and the more difficultly split glycerides are again treated in coil 139a under more drastic temperature and pressure conditions. Therefore, the more easily split glycerides are not subjected to the more drastic conditions and there is little danger of decomposing any of the constituents in the splitting system.

In the process of Figure 6, provision is made for keeping separate the products of splitting from a first or mild splitting step and the second or more drastic splitting step. In accordance with this figure, a mixture of glycerides and water is forced by a pump 149 through a heating coil 149a. The mixture is delivered to a vapor separating chamber 149b wherein glycerin, fatty acids, and water vapors are separated and the vapors passed through an entrainment separator 149c to a condenser 149d. Additional condensers 149e and 149f are provided for condensing different fractions of glycerin, fatty acids and water. The unsplit glycerides are withdrawn from the vapor separating chamber 149b through a pipe 149g and forced by a pump 149h through a pipe 149i and through a second heating coil 149j. Splitting water is introduced into the pipe 149i from the pipe 149k as hereafter explained and the heated mixture from the heating coil 149j is delivered to a second vapor separating chamber 149m. Vapors from the second evaporating chamber 149m are passed through a second entrainment separator 149n to a condenser 150. Additional condensers 150a and 150b are provided for condensing different fractions of glycerin, fatty acids and water. The splitting water for the second splitting step may be obtained from either or both of the water condensers 149f or 150b and forced by a pump 150c through the pipe 149k to the pipe 149i or fresh water may be obtained from the tank 150d and forced by the pump 150e through the pipe 149k to pipe 149i. While a conveyor 150f has been illustrated in connection with the first vapor separating chamber 149b of Figure 6, such a conveyor is ordinarily unnecessary and may be dispensed with as all of the solid or plastic materials will normally be deposited in the second vapor separating chamber. The conveyor 150g illustrated in connection with the second vapor separating chamber 149m may be employed to remove solid or plastic impurities from this chamber particularly if complete splitting is obtained by passing the unsplit glycerides through the coil 149j. If complete splitting is not obtained, unsplit liquid glycerides may be withdrawn through the pipe 151 from the second vapor separating chamber 149m and forced by means of a pump 152 into the pipe 149k so as to be again subjected to splitting in the coil 149j. To prevent the building up of unvaporizable materials in the system all or a portion of the liquid materials from the second vapor separating chamber may be discharged from the system through the pipe 153.

Thus, in accordance with Figure 6, the split materials from a first splitting step may be kept separate from the materials subjected to a second and more drastic treating step. The fatty acids recovered in the condensers 149d or 149e will ordinarily be found to differ from those recovered in condensers 150 or 150a and in case the drastic splitting conditions necessary in coil 149j to completely split the glycerides cause decomposition of any materials in the system, the fatty acids recovered in the condensers 149d or 149e are of better quality than those recovered in the condensers 150 or 150a.

In the modified apparatus in Figure 7, a process essentially similar to that illustrated in Figure 5 may be carried out. In this figure a mixture of water and glycerides is formed by injecting a stream of water into a flowing stream of glycerides at 154. The pump 155 withdraws glycerides from a tank 156 and delivers them through a pipe 157 to the heating coil 157'. A pump 158 withdraws water from a tank 159 and injects the water into the pipe 157 at the point 154. Two vapor separating chambers 159a and 159b are employed alternatively. By opening the valve 160 in the pipe 160' and closing the valve 161 in the pipe 161a the heated mixture from the heating coil 157' may be delivered to the upper vapor separating chamber 159a. Vapors are withdrawn therefrom through the entrainment separator 161b and delivered to a condenser 161c. Additional condensers 161d and 161e are provided so that any desired fractions of glycerin fatty acids, and water may be condensed therein. Unsplit materials are withdrawn from the vapor separating chamber 159a through the pipe 161f by pump 161g and forced through a pipe 161h and a second heating coil 161i. Additional water is supplied to the unsplit glycerides from the tank 161j by means of a pump 161k which delivers the water through a pipe 162 into the pipe 161h.

The heated mixture from the second coil 161i is return to the upper vapor separating chamber 159a through a pipe 163. Alternatively the lower or alternate vapor separating chamber 159b may be employed by closing the valve 160 in the pipe 160' and opening the valve 161 in the pipe 161a. Vapors are withdrawn from the alternate evaporating chamber through the entrainment separator 163a and delivered to the condenser 161c. Unsplit glycerides are withdrawn from the alternate evaporating chamber 159b through a pipe 163b by a pump 163c and forced through a pipe 163d to the pipe 161h and from thence through the heating coil 161i. The heated material is then delivered to the alternate vapor separating chamber 159b through a pipe 163e by opening the valve in this pipe and closing the valve in pipe 163. Thus the vapor separating chambers 159a and 159b can be employed alternatively in conjunction with the two coils 157' and 161i so that one of the vapor separating chambers can be taken out of operation for cleaning during use of the other vapor separating chamber. This is necessary with certain types of fat having viscous and sticky unsplittable and non-volatile materials therein so that the vapor separating chambers must be periodically cleaned. As shown in Figure 7, water from the condenser 161e may be returned directly to the water tank 159 through the pipe 164 or all or a portion of this water may be discharged from the system through a pipe 165 to prevent the building up of vaporizable impurities in the system.

Figure 8:
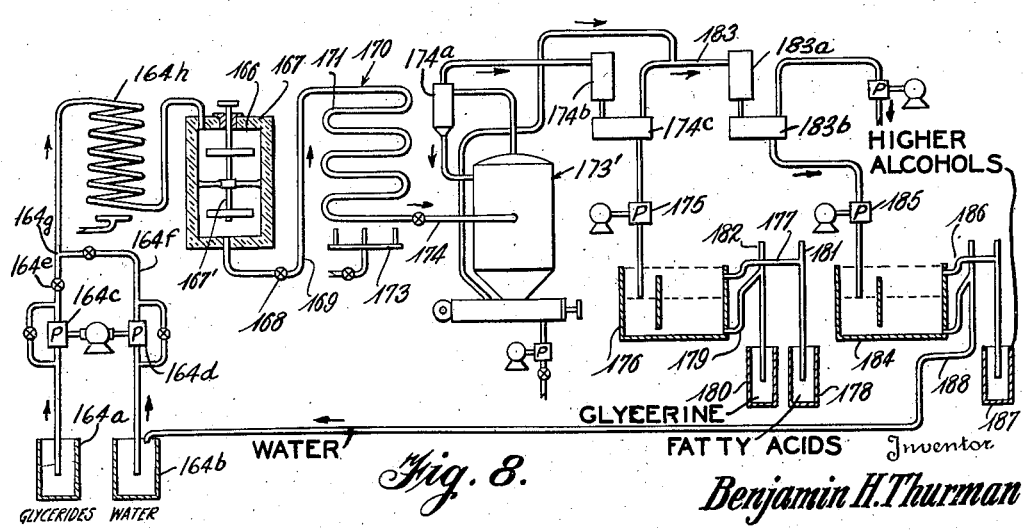
Figure 8 is a similar drawing of an apparatus for carrying out a further modified process for continuously separating condensed materials by gravity.

An apparatus for carrying on a further modified process is shown in Figures 8 and 9. In Figure 8 a pumping system similar to that shown in Figure 7 is employed including glyceride and water tanks 164a and 164b, respectively, pumps 164c and 164d, delivering glycerides and water, respectively, through pipes 164e and 164f to a junction 164g and thence through the heating coil 164h. Any other means for forming a glyceride water mixture such as those shown in Figures 2 and 3 may be employed. Instead of using a plurality of heating coils such as 164h a tank 166 provided with heat insulation 167 and preferably an agitator 167' may be employed for subjecting the mixture to high temperatures under pressure for a predetermined length of time. A valve 168 in the pipe 169 leading to a second heating device 170 may be adjusted to maintain the desired pressure in the coil 164h and tank 166. A different type of heating device 170 has been illustrated relative to the second heating step of Figure 8 and may include a grid of pipes 171 positioned in a radiant heating device illustrated in Figure 9. The radiant heating device may include refractory walls 172 positioned on both sides of the grid 171 and a burner 173 arranged to direct flames and products of combustion against the refractory walls 172. Such a device has been found to provide for quickly and uniformly supplying heat to a fluid passing through the grid 171. If it is desired to more quickly heat material in the heating step in any of the processes illustrated, such a heating device may be substituted for the heating coils shown therein. For example, the heating device 170 may be substituted for the heating coil 164h of Fig. 8 and the heating devices in Figures 2, 5, 6 and 7.

In the heating device 170 the partially split mixture is subjected to splitting in the presence of vapors and the mixture of glycerin water and fatty acids delivered into the vapor separating chamber 173' through a pipe 174. Vapors are withdrawn through an entrainment separator 174a and delivered to a condenser 174b for condensing glycerin and fatty acids. A receiver 174c is provided for receiving the condensed glycerin and fatty acids and this condensing mixture is pumped by a pump 175 into a continuous gravity separator 176 which may be similar to a conventional Florentine flask. The fatty acids are immiscible with and lighter than the glycerin and collect in the top of the separator 176. They may continuously overflow through a pipe 177 into a fatty acid receptacle 178. Similarly the glycerin may overflow through a pipe 179 into a glycerin receptacle 180. Pipes 177 and 179 may be provided with vents 181 and 182, respectively, to prevent siphoning.

Water vapors are removed from the receiver 174c through a pipe 183 and delivered to a condenser 183a provided with a receiver 183b for condensed water. It has been found that vaporizable impurities, such as higher alcohols, for example, sterols, are present in certain fats and are condensed with the water in condenser 183b. These impurities are immiscible with, and lighter than, the water and a gravity separator 184 may be provided for separating and recovering these materials. A pump 185 is provided for delivering the water and contained impurities into the separator 184. These impurities may overflow through a pipe 186 into a receptacle 187 and the water may overflow through a pipe 188 and is preferably returned through the pipe 188 to the water supply tank 164b. The water collecting in receiver 183b may also contain small amounts of glycerin and fatty acids. The glycerin is miscible with the water and is returned therewith to the water supply tank 164b.

Thus the glycerin and fatty acids may be continuously separated by a difference in specific gravity and separately recovered, although they are condensed in the same condenser. Also vaporizable impurities which are immiscible with the water may be condensed along with the water and continuously separated therefrom so that they are discharged from the system and are prevented from building up in the system when water is continuously returned. These vaporizable impurities are in many instances a valuable byproduct and can be separately recovered by the process of Figure 8.

Instead of using the gravity separators centrifugal separators as diagrammatically illustrated in Figure 10, may be substituted therefor to separate either the glycerin from the fatty acids or the water from vaporizable impurities or both as the various materials differ in specific gravity and are immiscible in each other. Thus, in Figure 10 the condensed glycerin and fatty acids condensed in condenser 189 may be withdrawn from the receiver 189a by the pump 189b and delivered to a continuous centrifugal separator indicated diagrammatically at 190. The fatty acids are the lighter effluent and are discharged through the spout 191 into a receptacle 191a and the glycerin is discharged through the spout 192 into the receptacle 192a. Similarly the water and impurities immiscible therewith which are condensed in condenser 192b are withdrawn from the receiver 192c by the pump 192d and delivered to a centrifugal separator 193. The lighter effluent including the vaporizable impurities and any small portions of fatty acids which may reach the centrifugal separator 193 are discharged through a spout 194 into the receptacle 194a. The water and any small portions of glycerin contained therein are discharged from the centrifugal separator 193 through a spout 195 connected to the pipe 188 which returns this water to the system as illustrated in Figure 8. The continuous gravity or centrifugal separators for either the glycerin and fatty acids or the water and vaporizable impurities or for both of these separations may be employed in any of the processes illustrated with respect to Figures 2 to 7, inclusive.

Thus, any type of fat may be treated. An easily treated fat can be treated in a single splitting step and the products collected by vaporization and condensation. Any solid or viscous material may be removed by the conveyors and any unsplit liquid materials can be continuously removed from the vaporizing chambers by the pumps illustrated in connection therewith. If a more difficult fat is encountered, the fat can be partially split in one heating system, the split vapors removed in one vaporizing chamber and the unsplit fat again subjected to heat and pressure in a second heating device. The vapors from the second heating step can be returned to the same evaporating chamber and this process will ordinarily be employed. However, as shown in Figure 6, two evaporating chambers may be employed and the split materials from successive splitting operations separately recovered.

Instead of employing the proportional mechanism of Figure 2, or its equivalent, with or without a mixing device, it may, in certain instances, be more desirable to employ the batch mixing device shown diagrammatically in Figure 3. In either case the fats, and also the water, may be preheated. The water may be preheated to substantially its boiling point and the glycerides preheated to a temperature just below that at which deterioration will take place in contact with the air.

As indicated above, any of the processes may be operated with water alone. The proportions of water and glyceride will vary depending upon the type of glyceride being split but approximately a one to one ratio of water and glyceride has ordinarily been found satisfactory. Any fat splitting catalysts, such as, for example, zinc oxide, sodium carbonate or other alkalis or Twitchwell reagents, may however be employed with the water. If a catalyst is employed, glycerin sweet waters from soap making processes have been found extremely efficient and, in addition to being expensive, provide for the recovering of the glycerin from the sweet waters. The conveyor systems illustrated are capable of removing salt and other solid materials ordinarily associated with glycerin sweet waters. When this catalyst is used, the solid impurities can, therefore, be continuously withdrawn from the evaporating chambers. The mixed materials are subjected in a heating zone to a fat splitting temperature and pressure for sufficient time to cause the water to react with the glyceride. The pressure is produced by means of a high pressure pump and is maintained by either making the passage through the heating zone of small cross section or restricting the discharge from the heating zone. The latter is preferable, since a relatively high pressure at the zone of greatest temperature is thereby produced. As the velocity of flow in the heating zone is preferably maintained such that the materials are substantially uniformly heated, higher temperatures than have heretofore been used in fat splitting may be employed. Also extremely high pressures can be used and the temperature and pressure so balanced that the splitting can take place while preventing the formation of vapor. Preferably splitting is carried on in one or more heating devices under sufficient pressure to prevent substantial vapor formation and then the pressure reduced while the temperature is maintained so that there is substantial vapor formation before the mixture is delivered into a vapor separating chamber. Not only is splitting more efficiently carried on under these conditions, but the fatty acids and glycerin are more easily separated as vapors in the vapor separating chambers. Less additional heat is necessary to be imparted to the materials in the vapor separating chambers when the glycerin and fatty acids are delivered into the chamber, at least partially in vapor form. Upon leaving the heating device, any lumps or agglomerations of solid or plastic materials may be broken up by passage through a thermostat, such as illustrated in Figure 2, or other mixing device between the heating devices or between the last heating device and the vaporizing chamber, although with many fats, this expedient is unnecessary.

By applying heat to the walls of the vapor separating chambers in which glycerin and fatty acids are separated the drop in temperature due to expansion of vapors and the vaporization of liquid materials discharged into the vapor separating chamber is compensated for and the vapor separating zone is maintained at a temperature sufficient to quickly and substantially completely vaporize any glycerin, water and fatty acids which enter the zone in the liquid form. When glycerin and fatty acids are evaporated, the vacuum maintained in the vapor separating chamber should be very close to a perfect vacuum, although a lower vacuum will operate satisfactorily as long as the fatty acids are in contact with a large body of water and glycerin vapors.

If the fat is highly refined, it becomes unnecessary to withdraw tar or solid materials at frequent intervals and in some cases the conveyors illustrated may be dispensed with. However, for continuous operation with most commercial fats, it becomes important to withdraw such tar or other materials without exposing any of the materials in the process to the air. It is highly important that fatty acids be protected from contact with the air when they are in a highly heated condition and for most fats it is further extremely important that the fatty acid vapors be maintained in a high vacuum, otherwise decomposition will result. The fatty acids and glycerin are not contaminated with unsplit fats and other substances and may be separately recovered by employing a plurality of condensers or the gravity separating step of Figure 8 or continuous centrifugal separators of Figure 10. Light colored fats are recovered contrary to the experience of the art in other processes in which splitting operations invariably discolor the fatty acids and require redistillation thereof. Temperatures from those at which the fat begins to split, that is, temperatures from slightly above the boiling point of water, up to those approaching the temperature at which decomposition of the fats takes place may be employed. The lowest temperature at which satisfactory splitting occurs should be employed and for most fats this will be in the neighborhood of 450° F. to 555° F. Pressures from the ordinarily used pressures in batch operations, i. e., pressures in the neighborhood of 120 to 150 pounds per square inch may be employed, although higher pressures up to 2000 pounds per square inch may be used, depending upon the temperature employed and the fat being treated, without deleteriously affecting the fatty acids.

While an entrainment separator has been illustrated in the drawings, for the purpose of returning liquid and solid materials entrained in the vapor to the vapor separating chamber, a dephlegmating tower above the vacuum chamber may be employed to accomplish this result and will, in addition, largely return any vaporized materials other than water, glycerin and fatty acids which may go over with the vapors, thus producing purer products. Such entrainment separators or dephlegmating towers may be omitted in certain instances where no trouble is encountered by the entrainment of solids and liquids with the vapors withdrawn from the vapor separating chamber.

Instead of splitting glycerides and recovering the components as described above, the processes of Figures 1 to 10 may be utilized to recover glycerin from the mixtures of fatty acids, glycerin, and other substances from prior splitting operations such as the batch processes of the prior art, as well as from glycerin sweet waters that are left in soap making or from other materials, such as winery or brewers slops, also containing solid or plastic non-volatiles.

Heretofore it has been customary to evaporate the sweet waters in an evaporator with jacket steam under vacuum to remove the water. The inorganic salts were salted out. The evaporators are large and expensive to install and operate, requiring considerable space and steam, and entail problems of recovery of glycerin from the salt catch tanks as well as the removal of salt which cakes on the condenser tubes. The latter causes a shut-down after the glycerin gets to a certain concentration, and time and labor are consumed for cleaning the equipment.

The reason this well-known evaporator method has been used is because of the low vapor pressure of glycerin, or its resistance to vaporizing. The water content of the sweet waters is often ten (10) times the glycerin content. An appreciable amount of vaporization of the glycerin does not take place at the temperature at which sweet waters are boiled and the water is evaporated therefrom. This boiling is caused to take place under vacuum so that the temperature is below 212° F. which is considerably less than the boiling point of water at atmospheric pressure. Therefore, before glycerin can be vaporized in the well-known methods, it is necessary to first get rid of the water so that the temperature of the glycerin can be raised to cause an increase of vapor pressure. Nevertheless, even though glycerin is concentrated to 80% or 90% strength in this manner by water removal only, when this crude glycerin is distilled to purify it, water must again be added in the form of steam which is preferably superheated steam. The vapor pressure of glycerin is 64 millimeters of mercury while that of water is 760 millimeters at 212° F. Ten percent of glycerin in water raises the boiling point of the latter 0.9° C. and the removal of glycerin by boiling at this temperature and at atmospheric pressure, will be in the ratio of 64 parts of glycerin to 760 parts of water.

Although glycerin will evaporate very slowly at atmospheric pressure even when held at a temperature of 160° C. for a long period of time, some of it will decompose into what is called "polyglycerols." For that reason glycerin is always distilled in the presence of a large percentage of free steam which undoubtedly acts as a carrier to increase the vapor pressure of the glycerin and to more or less mechanically vaporize it, or lift it into vapors and carry it off with the steam, thus minimizing polymerization at the high temperatures at which it would be distilled or volatilized.

The necessity of using evaporators, vacuum pumps, high pressure boilers and steam to recover glycerin from glycerin sweet water is avoided by the present invention. In carrying out the invention for this purpose and referring particularly to Figure 1, the glycerin waters are passed from a source of supply, such as the storage tank 1, through the coil 7 or a series of such coils that are heated by direct flame. The source of heat may be either gas or petroleum fuel of any type convenient and suitable for heating purposes. The pump 3 draws the weak glycerin waters from the storage tank 1 and forces them through one or more coils 7 or any other suitable type of elongated passageway which will cause change in direction to produce turbulence so as to give intimate mixing and rapid heat transfer from the hot combustion gases surrounding the coil or passageway.

In operating on what is called glycerin "sweet waters" the preferable temperature to which the sweet waters are to be raised in passing through the heated coil or elongated passageway is 300° to 400° F.

When the glycerin waters reach the outlet of this elongated passageway, which may be 200 to 250 feet (or longer) in length, they pass through the nozzle 32 placed at the exit to control the pressure desired in this elongated passageway. It has been found that up to 250 pounds pressure is desirable as the temperature of the sweet waters can be raised much more economically by this means than by using superheated steam. At the same time, the high pressure prevents too much of the glycerin or the water in the sweet waters from vaporizing. The salts in the sweet waters remain in solution while they are in the coil 7 and are therefore prevented from precipitating out and choking up this elongated passageway. The objection of having to clean the salt which sticks to the tubes in the evaporator is thereby eliminated.

The sweet waters containing glycerin, water and inorganic salts and some organic matter after being heated in the coil or passageway 7 are expanded through the nozzle 32 into the chamber 33 which may be heated as described above. Or it may be heated, for example, by the products of combustion escaping from the outlet 8' of the chamber 8 that is used to heat the elongated passageway 7. This chamber 33 is preferably kept at a low pressure.

A suitable burner, such as the burner 28, which can be regulated and controlled by the heat regulator 9, is provided to raise the temperature of the combustion gases for the elongated passageway chamber 8 to the desired temperature. The temperature of the chamber 33 into which the glycerin, etc., is discharged is preferably approximately equal to the temperature of the sweet waters after they escape from the exit end of the elongated coil or passageway 7, although the temperature in the expansion chamber 33 may be lower.

The glycerin and the water sprayed from the nozzle 32 into the expansion chamber immediately flash into vapor, being suddenly released from the high pressure at the elevated temperature, and the vapors may be caused to pass out of the chamber 33 through the assistance of the vacuum pump or blower or fan 38 into the condenser 40. This condenser is operated at a temperature dependent on how concentrated it is desired to have the glycerin or how free it is desired to remove the water from the glycerin. This condenser can be regulated by turning different amounts of cooling water into the condenser tubes 41 to condense all the glycerin and the water together or to condense mainly glycerin free from water. In the latter case the water vapors may be permitted to pass out into the air or they may be cooled by one or more condensers which may be kept at temperatures sufficiently low to condense the water vapor.

When it is desired to concentrate the glycerin or free it from water, the first condenser should be kept at about 250° F. to 350° F.; the second condenser at a temperature from about 225° F. to 250 F.; and the third at a temperature below 212° F. which will condense the water only. These condensers should be supplied with receivers to catch the condensates.

In this way the glycerin and water can be readily removed from the inorganic salts which are often dissolved in sweet waters in amounts from 5% to 10%. At times the inorganic salts in sweet waters from lye kettles run as high as the glycerin content.

It is very important not to heat these inorganic salts alone with a high concentration of glycerin because they tend to break the glycerin down into acrolin. The operation of evaporating sweet waters is wasteful when this has to be done in the ordinary way with evaporators to concentrate the glycerin and remove the water and salt.

With the present invention the salt, freed from water and glycerin, drops to the bottom of the expansion chamber 33 and may be removed from this chamber by a valve or a closed screw conveyor, for example. This salt contains most of the inorganic impurities which are present in the sweet waters so that by this invention a process is provided for the purification of the distillate as well as the removal of the salts which are present in the sweet waters.

By this process glycerin waters that contain large quantities of organic substances, such as sweet waters or other glycerin waters, for example, those from wine slops and/or the fermentation method for making glycerin, where the percentage or ratio of organic material other than glycerin is so high compared to the glycerin itself that recovery by the well-known evaporator method is exceedingly difficult and very uneconomical, may be treated to recover the glycerin.

The system illustrated in Fig. 2 is particularly adapted for treating glycerin sweet waters and other materials containing glycerin. These glycerin-containing materials with or without preheating may be pumped through one of the heating devices 73', 78 and 79 and therein heated to an elevated temperature sufficient to cause the glycerine and other volatile materials to be separated in the vapor separating chamber 94'. An elevated pressure may also be employed in the heating coils so that sufficient heat can be imparted to the materials passing therethrough to produce such vaporization. Most of these materials contain salts or non-volatile organic material which will collect in the bottom of the vapor separating chamber 94'. The screw conveyor 105 is particularly efficient in removing such materials from the vapor separating chamber and cooling the same out of contact with the atmosphere so that the high temperatures of these materials is reduced before they contact with the atmosphere. The residues from wine or brewers slops and other materials containing glycerin are in many cases valuable by-products if they can be recovered without deterioration. The present process is effective for this purpose.

The glycerin and other volatile materials are withdrawn from the vapor separating chamber in vapor form and fractionally condensed in the condensers 101 and 103. Thus, other alcohols or any other valuable volatile substances contained in the materials being treated can be separately recovered by fractional condensation or subsequent gravity or centrifugal separations or by subsequent distillations.

Some of the advantages of this invention are due to the fact that the glycerin, together with a large amount of water in which the glycerin is originally contained, is heated very economically; the heated materials are atomized into a chamber from a very high pressure to either atmospheric or sub-atmospheric pressure and an enormous expansion several hundred times each droplet size is allowed to take place, thereby exposing a very large surface area to ready vapor separation. This is impossible in the ordinary evaporator even when forced circulation is applied to the sweet waters under treatment in the evaporator.

A great deal of the organic impurities which are soluble in glycerin but are not volatilized are retained in the crude glycerin made by the usual and well-known evaporator method, while by the present method all of these inorganic impurities which are not volatile remain behind with the salt and are therefore removed and do not interfere with the subsequent refinement of the glycerin. Heretofore it has been very expensive to produce chemically pure glycerin as the glycerin refiner had to treat the sweet waters or glycerin liquors by first acidifying and filtering and then neutralizing and boiling with lime, and filtering again, then adding soda ash to remove the lime salts before evaporating them. By the present process the necessity of this refinement of the sweet waters is obviated. The prior method of refining glycerin, including this operation on the sweet waters, does not remove the organic impurities as completely as the present method and also in the prior method when the crude glycerin was distilled there was a considerable amount of residue left in the still which comprised organic impurities and some ash or mineral salts. This residue caused a loss of pure glycerin and was exceedingly difficult to remove from the still. This trouble is minimized by treating sweet waters or glycerin liquors by the present method.

This application is a continuation in part of my copending application, Serial No. 684,225, filed August 8, 1933.

While I have disclosed the preferred embodiments of my invention, it is understood that the invention is not to be limited to the details thereof but may be varied within the scope of the following claims.

What I claim is:

1. The process of splitting glycerides, which comprises, subjecting said glycerides in admixture with water in a splitting zone to a high temperature and superatmospheric pressure sufficient to cause liberation of glycerin and fatty acids, discharging a heated stream of the resulting mixture from said zone into a vapor separating zone, maintaining a high temperature and vacuum sufficient to separate as vapors glycerin and fatty acids in said vapor separating zone, withdrawing and condensing the vapors of glycerin and fatty acids, and pushing solid and plastic materials deposited in said evaporating zone from said evaporating zone while maintaining said vacuum.

2. The process of splitting glycerides, which comprises, subjecting said glycerides in admixture with water to a glyceride splitting step in a splitting zone, delivering a heated stream of the resultant mixture into a vapor separating zone at a temperature sufficiently high to cause separation of vapors of glycerine and fatty acids, maintaining a vacuum in said vapor separating zone and supplying additional heat to said vapor separating zone sufficient to cause substantially complete separation of said glycerin and fatty acids as vapors, withdrawing unsplit glycerides from said vapor separating zone and subjecting the same in admixture with water to further splitting, delivering the mixture resulting from said further splitting to a vapor separating zone maintained under vacuum conditions, and withdrawing and condensing the vapors of said glycerin and fatty acids produced in said process.

3. The process of splitting glycerides, which comprises, subjecting said glycerides in admixture with water to a glyceride splitting step, delivering a heated stream of the resultant mixture to a vapor separating zone at a temperature sufficiently high to cause separation of the glycerin and fatty acids resulting from said splitting step as vapors from unsplit glycerides, withdrawing unsplit glycerides from said vapor separating zone and subjecting the same in admixture with water to further splitting, delivering the mixture from said further splitting to a vapor separating zone at a temperature sufficiently high to cause further separation of glycerin and fatty acids as vapors, and withdrawing and condensing the vapors of glycerin and fatty acids at a rate sufficient to maintain a vacuum in said vapor separating zone.

4. The process of splitting glycerides, which comprises, subjecting said glycerides in admixture with water to a glyceride splitting step in a splitting zone, delivering a heated stream of the resultant mixture into a vapor separating zone at a temperature sufficiently high to cause separation of vapors of glycerin and fatty acids from unsplit glycerides, withdrawing unsplit glycerides from said vapor separating zone and returning the same to said splitting zone for further splitting, and withdrawing and condensing the vapors of said glycerin and fatty acids at a rate sufficient to maintain a vacuum in said vapor separating zone.

5. The process of splitting glycerides, which comprises, subjecting said glycerides in admixture with water to a glyceride splitting step in a splitting zone, delivering a heated stream of the resultant mixture into a vapor separating zone, maintaining a high temperature and vacuum in said evaporating zone sufficient to cause vaporization of glycerin and fatty acids therein, withdrawing and condensing the vapors of said glycerin and fatty acids, and withdrawing unvaporized materials deposited in said vapor separating zone from said vapor separating zone without impairing said vacuum.

6. The process of splitting glycerides of fatty acids and separately recovering glycerin and fatty acids, which comprises, forcing a mixture of said glycerides and water through a heating zone under an imposed pressure, subjecting said mixture in said zone to sufficient temperature, pressure and time of treatment to cause the water to react with said glycerides and liberate glycerin and fatty acids, maintaining sufficient velocity of said mixture in said zone to produce substantially uniform heating thereof, discharging a stream of the resultant heated mixture into a vapor separating zone, maintaining a vacuum sufficiently low and a temperature sufficiently high in said vapor separating zone to vaporize glycerin and fatty acids therein, and withdrawing and condensing the vapors of said glycerin and fatty acids.

7. The process of splitting glycerides of fatty acids and separately recovering glycerin and fatty acids, which comprises, forcing a mixture of said glycerides and water through a heating zone under an imposed pressure, subjecting said mixture in said zone to sufficient temperature, pressure and time of treatment to cause the water to react with said glycerides and liberate glycerin and fatty acids, maintaining sufficient velocity of said mixture in said zone to produce substantially uniform heating thereof, discharging a stream of the resultant heated mixture into a vapor separating zone, maintaining a vacuum sufficiently low and a temperature sufficiently high in said vapor separating zone to separate in vapor form liberated glycerin and fatty acids from unvaporized material therein, and withdrawing unvaporized materials from said vapor separating zone without breaking the vacuum.

8. The process of splitting glycerides of fatty acids and separately recovering glycerin and fatty acids, which comprises, forcing a mixture of glycerides and water through a heating zone under an imposed pressure, subjecting said mixture in said zone to sufficient temperature, pressure and time of treatment to cause the water to react with said glycerides and liberate glycerin and fatty acids, moving said mixture through said heating zone with sufficient velocity to produce substantially uniform heating thereof, discharging a stream of the resultant heated mixture into a vapor separating zone, maintaining a vacuum sufficiently low and adding sufficient additional heat to said vapor separating zone to vaporize glycerin and fatty acids therein, withdrawing and condensing the vapors of said glycerin and fatty acids, and withdrawing unvaporized materials from said vapor separating zone without breaking said vacuum.

9. The process of splitting glycerides of fatty acids and separately recovering glycerin and fatty acids, which comprises, forcing a mixture containing glycerides and water through a heating zone under an imposed super-atmospheric pressure, subjecting said mixture in said zone to sufficient temperature, pressure and time of treatment to cause the water to react with said glycerides and liberate glycerin and fatty acids, said temperature being sufficiently high to vaporize at least a portion of the volatile materials at the pressure in said zone before they are discharged from said zone, maintaining sufficient velocity of said mixtures in said zone to produce substantially uniform heating thereof, discharging a stream of the resultant heated mixture containing vapors into a vapor separating zone, maintaining a vacuum sufficiently low in a temperature sufficiently high in said vapor separating zone to separate in vapor form glycerin and fatty acids from unvaporized material therein, and withdrawing and condensing the vapors of said glycerin and fatty acids.

10. The process of splitting glycerides of fatty acids and separately recovering glycerin and fatty acids, which comprises, pumping a properly proportioned stream of a mixture of a glyceride of a fatty acid and water through a heating zone, subjecting said mixture in said zone to sufficient temperature, pressure and time of treatment to cause the water to react with said glycerides to liberate glycerin and fatty acids, maintaining sufficient velocity of said mixture in said zone to produce substantially uniform heating thereof, discharging the resultant stream of heated mixture into a vapor separating chamber maintained under a relatively high vacuum, applying additional heat through the walls of said vapor separating chamber to maintain a temperature sufficiently high therein to vaporize glycerin and fatty acids discharged into said chamber, and withdrawing and condensing the vapors of said glycerin and fatty acids.

11. The process of splitting glycerides of fatty acids and separately recovering glycerin and fatty acids, which comprises, forcing a mixture of said glycerides and water through a heating zone under an imposed pressure, subjecting said mixture in said zone to sufficient temperature, pressure and time of treatment to cause the water to react with said glycerides and liberate glycerin and fatty acids, maintaining sufficient velocity of said mixture in said zone to produce substantially uniform heating thereof, discharging a stream of the resultant heated mixture into a vapor separating zone, maintaining a vacuum sufficiently low and a temperature sufficiently high in said evaporating zone to cause glycerin and fatty acids to separate in vapor form from unsplit glycerides therein, withdrawing unsplit liquid glycerides from said vapor separating zone, mixing the same with additional water, forcing the mixture of unsplit glycerides and water through a second heating zone, subjecting the same to sufficient temperature, pressure and time of treatment to cause additional splitting of said glycerides, discharging the resultant heated mixture into a vapor separating zone wherein the glycerin and fatty acids are separated in vapor form from unvaporized material and withdrawing and condensing the vapors of said glycerin and fatty acids produced in said process.

12. A continuous process of splitting glycerides of fatty acids, which comprises, continuously forcing a mixture of materials including said glycerides and water through a reaction zone by an imposed superatmospheric pressure, maintaining sufficient velocity of said materials in said zone to cause substantially uniform contact between said materials and prevent local overheating, subjecting said materials in said zone to temperature and pressure sufficiently high to cause glycerides to split into glycerin and fatty acids, continuously discharging a stream of reaction products containing glycerin and fatty acids from said reaction zone into a vapor separating zone, maintaining a subatmospheric pressure in said vapor separating zone sufficiently low and the temperature sufficiently high to cause substantially complete separation of the glycerin and fatty acids discharged from said reaction zone as vapors, and condensing said glycerin and fatty acids to recover the same.

13. The process of splitting glycerides which comprises, subjecting a mixture of glycerides and water to splitting temperatures and pressures in a splitting zone, delivering a stream of the resultant mixture into a vapor separating zone, maintaining a temperature and vacuum in said evaporating zone sufficient to cause separation of glycerin and fatty acids therein as vapors, withdrawing vapors from said vapor separating zone and condensing the same to form a mixture of liquid glycerin and fatty acids and thereafter employing the difference in specific gravity between said glycerin and fatty acids to separate the same.

14. The process of splitting glycerides which comprises, subjecting a mixture of glycerides and water to splitting temperatures and pressures in a splitting zone, delivering a stream of the resultant mixture into a vapor separating zone, maintaining a temperature and vacuum in said vapor separating zone sufficient to cause separation of glycerin and fatty acids therein as vapors, withdrawing vapors from said vapor separating zone and condensing the same to form a mixture of liquid glycerin and fatty acids and thereafter separating said glycerin from said fatty acids by a continuous gravity settling step.

BENJAMIN H. THURMAN.

CERTIFICATE OF CORRECTION.

Patent No. 2,190,616. February 13, 1940.

BENJAMIN H. THURMAN.

It is hereby certified that error appears in the printed specification of the above numbered patent requiring correction as follows: Page 2, first column, line 6, for "discolloration" read discoloration; line 26, for the word "mixture" read mixing; page 3, second column, line 23, for "volve" read valve; page 8, first column, line 43, after "apparatus" insert illustrated; line 73, for "return" read returned; page 9, second column, line 48, for "expensive" read inexpensive; page 13, first column, line 69, claim 9, for "in" read and; and that the said Letters Patent should be read with this correction therein that the same amy conform to the record of the case in the Patent Office.

Signed and sealed this 9th day of April, A. D. 1940.

(Seal)

Henry Van Arsdale,
Acting Commissioner of Patents.